(12) United States Patent
Calo et al.

(10) Patent No.: US 9,374,418 B2
(45) Date of Patent: *Jun. 21, 2016

(54) SYSTEMS, METHODS AND ALGORITHMS FOR LOGICAL MOVEMENT OF DATA OBJECTS

(71) Applicant: International Business Machines Corporation, Armonk, NY (US)

(72) Inventors: Seraphin B. Calo, Cortlandt Manor, NY (US); Raheleh B. Dilmaghani, Elmsford, NY (US); Kang-Won Lee, Nanuet, NY (US); Vasileios Pappas, Elmsford, NY (US); Ramya Raghavendra, White Plains, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 375 days.

This patent is subject to a terminal disclaimer.

(21) Appl. No.: 13/785,741

(22) Filed: Mar. 5, 2013

(65) Prior Publication Data

US 2014/0207903 A1    Jul. 24, 2014

Related U.S. Application Data

(63) Continuation of application No. 13/745,194, filed on Jan. 18, 2013.

(51) Int. Cl.
| | | |
|---|---|---|
| *G06F 15/16* | (2006.01) | |
| *H04L 29/08* | (2006.01) | |
| *G06F 9/00* | (2006.01) | |
| *G06F 17/30* | (2006.01) | |

(52) U.S. Cl.
CPC .............. *H04L 67/1029* (2013.01); *G06F 9/00* (2013.01); *G06F 17/302* (2013.01); *H04L 67/10* (2013.01); *H04L 67/16* (2013.01)

(58) Field of Classification Search
CPC ....... H04L 47/781; G06F 13/14; G06F 13/16; G06F 13/20; G06F 13/36102; G06F 13/105; G06F 13/36; G06F 13/102
USPC .................................................. 709/217, 226
See application file for complete search history.

(56) References Cited

U.S. PATENT DOCUMENTS

| | | | |
|---|---|---|---|
| 6,085,193 A | * | 7/2000 | Malkin et al. |
| 6,463,454 B1 | | 10/2002 | Lumelsky et al. |
| 6,484,204 B1 | | 11/2002 | Rabinovich |

(Continued)

OTHER PUBLICATIONS

Baker et al., "Scalable Web Server Design for Distributed Data Management", 18 pages, Aug. 1998, Department of Computer Science, The University of Arizona.*

(Continued)

*Primary Examiner* — Douglas Blair
(74) *Attorney, Agent, or Firm* — Mercedes Hobson, Esq.; Scully, Scott, Murphy & Presser, P.C.

(57) ABSTRACT

The present disclosure relates generally to the field of logical movement of data objects. In various examples, the logical movement of data objects may reduce or eliminate network hotspots (e.g., avoid formation of hotspots, remove existing hotspots and/or reduce the magnitude of hotspots). In various examples, the logical movement of data objects may be implemented in the form of systems, methods and/or algorithms.

17 Claims, 7 Drawing Sheets

(56) References Cited

U.S. PATENT DOCUMENTS

| | | | |
|---|---|---|---|
| 6,563,454 B2 | 5/2003 | Akasu | |
| 6,687,731 B1* | 2/2004 | Kavak | 718/105 |
| 7,339,937 B2 | 3/2008 | Mitra et al. | |
| 2002/0156891 A1* | 10/2002 | Ulrich et al. | 709/225 |
| 2005/0125456 A1* | 6/2005 | Hara et al. | 707/200 |
| 2006/0165053 A1 | 7/2006 | Bhatnagar et al. | |
| 2006/0230099 A1* | 10/2006 | Maya et al. | 709/201 |
| 2007/0011420 A1* | 1/2007 | Boss et al. | 711/165 |
| 2007/0067280 A1 | 3/2007 | Zhou et al. | |
| 2008/0183774 A1 | 7/2008 | Otani et al. | |
| 2009/0192996 A1 | 7/2009 | Guo et al. | |
| 2009/0287835 A1 | 11/2009 | Jacobson | |
| 2012/0278442 A1* | 11/2012 | Saika | 709/219 |
| 2013/0039249 A1* | 2/2013 | Ravindran et al. | 370/312 |

OTHER PUBLICATIONS

Liao et al., "Boosting Data Access Based on Predictive Caching", 5 pages, Feb. 2011, IEEE.*

DiMarco, TT. et al., "Use of Alias Names to Reference Objects", IP.com, Sep. 1, 1995, pp. 297-302.

Spelce, DC. et al., "Method for Browsing Aliases and Network Names", IP.com, Jul. 1, 1995, pp. 51-52.

Alimi, R. et al., "A Survey of In-Network Storage Systems", IP.com, Oct. 1, 2011, pp. 1-44.

Song, Y. et al., "Power-aware Traffic Engineering with Named Data Networking", Mobile Ad-hoc and Sensor Networks (MSN), 2011 Seventh International Conference, Dec. 16-18, 2011, pp. 289-296.

Baker, S. et al., Scalable Web Server Design for Distributed Data Management, Department of Computer Science, The University of Arizona, (Aug. 1998), pp. 1-17.

Liao, C. et al., Boosting Data Access Based on Predictive Caching, Communication Software and Networks (ICCSN), 2011 IEEE 3rd International Conference, (May 27-29, 2011) pp. 93-97.

Weikum, G. et al., Towards Self-Tuning Memory Management for Data Servers, IEEE, (1999), 9 pages.

U.S. Office Action dated Jan. 21, 2016 issued in U.S. Appl. No. 13/745,194.

* cited by examiner

SYSTEMS, METHODS AND ALGORITHMS FOR LOGICAL MOVEMENT OF DATA OBJECTS

RELATED APPLICATION

This application is a continuation of U.S. Ser. No. 13/745,194, filed Jan. 18, 2013, the entire contents of which are incorporated herein by reference.

BACKGROUND

The present disclosure relates generally to the field of logical movement of data objects.

In various examples, the logical movement of data objects may reduce or eliminate network hotspots (e.g., avoid formation of hotspots, remove existing hotspots and/or reduce the magnitude of hotspots).

In various examples, the logical movement of data objects may be implemented in the form of systems, methods and/or algorithms.

DESCRIPTION OF RELATED ART

Points of congestion called "hotspots" typically occur in data center networks due to differences in the frequency of access for different data objects residing on different servers.

Movement of data objects from more congested servers to less congested servers can be used to ameliorate hotspot formation. Such movement, however, can be costly in terms of network bandwidth utilization (in particular for very large data objects) and can itself contribute to network congestion. In addition, access patterns may change, necessitating the redistribution of data objects over time.

Further, replication of data objects can be used to balance the aggregate access patterns. Such replication, however, typically requires substantially more storage and complicates data object updates, since all replicas must be simultaneously updated or different results will be returned depending upon which copy is accessed. It also typically requires changes to the routing mechanism to allow for accesses to be directed to the copy of the data object on the least loaded server. In addition, unless full replication of all data on all servers is employed, the locations of the replicas may need to be changed as access patterns vary over time.

An emerging networking paradigm is Named Data Networking (sometimes referred to herein as "NDN"). In NDN accesses to data objects is done based upon names (or object ids) instead of using a data object's IP address and path name information.

In the traditional client-server model, the client sends a request to a particular server address to retrieve a data object. In the NDN environment, information publishers "advertise" the objects that they host. Information requestors announce "interest" in a data object using its name. Information brokers direct the requestors to appropriate publishers.

FIG. 1 shows a block diagram of a conventional named data networking architecture. As seen in this example, information consumers 101A, 101B, 101C and 101D interact with information publishers 103A, 103B, 103C and 103D via information brokers 105A, 105B, 105C, 105D, 105E and 105F. In addition, common services 107A, 107B and 107C may be provided.

Still referring to FIG. 1, while the various entities and services are shown in groups, communication may be between and/or among any desired entity or entities as well as any desired service or services. Further, the communication may be carried out via the Internet, an intranet, a local area network, a wide area network and/or any other desired communication channel(s).

Of note, while FIG. 1 shows various entities (e.g., information consumers, information publishers, information brokers) communicating, it is to be understood that this FIG. 1 is actually referring to communication by computer system(s) or the like that are owned, leased, operated, used by, in the possession of, and/or controlled by appropriate entities.

SUMMARY

As described herein, in various embodiments logical data movement can be used to reduce or eliminate network hotspots. In one example, access patterns are measured over periods of time and data objects are placed on servers based upon the predicted access rates for the data objects. As the aggregate access patterns change, the data objects are logically moved between servers. Actual data object movement occurs only after there is an explicit request for a given data object. This avoids unnecessary movement and still allows for the appropriate migration to occur.

As described herein, the logical movement of data objects may be applied to traditional data center network architectures (e.g., IP address-based) and/or to new emerging architectures like named data networks when applied in the context of a data center.

In one embodiment, a method implemented in a computer system for movement of at least one data object from a first server to a second server is provided, the method comprising: advertising by the second server the data object to be available at the second server, wherein the data object is advertised as available at the second server while the data object is still at the first server; receiving by the second server a request for the data object; and receiving by the second server the data object after the data object has been moved from the first server.

In another embodiment, a method implemented in a computer system for movement of at least one data object between at least two of a plurality of servers is provided, the method comprising: determining a frequency of accesses to the data object, wherein the determined frequency of accesses is determined in at least one of a prior time period and a current time period; predicting a frequency of accesses to the data object, wherein the predicted frequency of accesses is predicted for at least one future time period and wherein the predicted frequency of accesses is predicted based at least in part upon the determined frequency of accesses; determining, based at least in part upon the predicted frequency of accesses, a future placement location of the data object on at least one of the plurality of servers, wherein the future placement location of the data object is on a server different from the server on which the data object currently resides; routing at least one request to the server at the future placement location of the data object before the data object has been moved to the server at the future placement location; and upon receiving an Nth request for the data object in the current time period, serving the request from the server on which the data object currently resides and moving the data object to the server at the future placement location.

In another embodiment, a computer readable storage medium, tangibly embodying a program of instructions executable by the computer for movement of at least one data object from a first server to a second server is provided, the program of instructions, when executing, performing the following steps: advertising by the second server the data object to be available at the second server, wherein the data object is advertised as available at the second server while the data object is still at the first server; receiving by the second server a request for the data object; and receiving by the second server the data object after the data object has been moved from the first server.

In another embodiment, a computer readable storage medium, tangibly embodying a program of instructions executable by the computer for movement of at least one data object between at least two of a plurality of servers is provided, the program of instructions, when executing, performing the following steps: determining a frequency of accesses to the data object, wherein the determined frequency of accesses is determined in at least one of a prior time period and a current time period; predicting a frequency of accesses to the data object, wherein the predicted frequency of accesses is predicted for at least one future time period and wherein the predicted frequency of accesses is predicted based at least in part upon the determined frequency of accesses; determining, based at least in part upon the predicted frequency of accesses, a future placement location of the data object on at least one of the plurality of servers, wherein the future placement location of the data object is on a server different from the server on which the data object currently resides; routing at least one request to the server at the future placement location of the data object before the data object has been moved to the server at the future placement location; and upon receiving an Nth request for the data object in the current time period, serving the request from the server on which the data object currently resides and moving the data object to the server at the future placement location.

In another embodiment, a computer-implemented system for movement of at least one data object between at least two of a plurality of servers is provided, the system comprising: a server, wherein: the server is configured to advertise the availability of the data object at the server, wherein the data object is advertised as available at the server while the data object is still at a different server; the server is configured to receive a request for the data object; and the server is configured to receive the data object after the data object has been moved from the different server.

In another embodiment, a computer-implemented system for movement of at least one data object between at least two of a plurality of servers is provided, the system comprising: a processor, wherein: the processor is configured to determine a frequency of accesses to the data object, wherein the determined frequency of accesses is determined in at least one of a prior time period and a current time period; the processor is configured to predict a frequency of accesses to the data object, wherein the predicted frequency of accesses is predicted for at least one future time period and wherein the predicted frequency of accesses is predicted based at least in part upon the determined frequency of accesses; the processor is configured to determine, based at least in part upon the predicted frequency of accesses, a future placement location of the data object on at least one of the plurality of servers, wherein the future placement location of the data object is on a server different from the server on which the data object currently resides; the processor is configured to route at least one request to the server at the future placement location of the data object before the data object has been moved to the server at the future placement location; and the processor is configured to, upon the detection of an Nth request for the data object in the current time period, direct serving of the request from the server on which the data object currently resides and direct moving the data object to the server at the future placement location.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
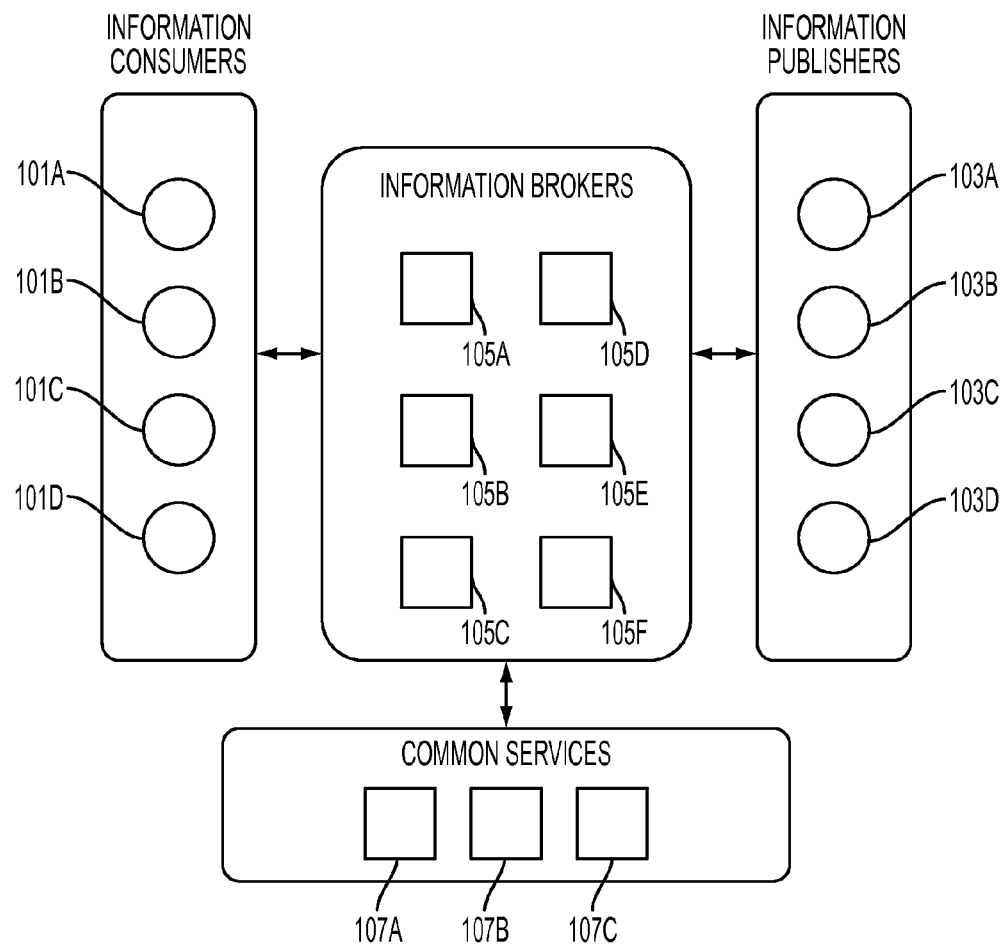
FIG. 1 depicts a block diagram of a conventional NDN information centric architecture for data center networks.

For the purposes of description, the term "data object" is intended to refer to a collection of digital data (a sequence of bytes of a given length) that can be stored in computer memory, has a value, and is referenced by an identifier (in one example, each data object may be accessed individually). Such a data object can be, for example, a single addressable content that a user can request. In other examples, a data object can be a segment of a file, or a file, or a collection of files, or a sequence of bytes that is generated dynamically. In other examples, a data object can be an audio file, a video file or a web page. In another example, a data object can be a part of a large file (e.g., a movie file can be broken down into multiple parts, each of which can be individually addressed and downloaded).

For the purposes of description, the term "advertise" is intended to refer to the communication to routing entities (e.g., information brokers) of the existence of a particular data object on a particular server.

As described herein, mechanisms are provided for measuring the access patterns for the data objects (e.g., all of the data objects) in a data center. In one example, the access patterns may be measured over certain period(s) of time. The history of such accesses over one or more prior and/or current periods of time can be used by a prediction algorithm to predict the access patterns in a future time period or periods. Methods such as, e.g., autoregressive modeling can be used for time series forecasting. In one example, value at a particular point in time may be expressed as a weighted linear combination of the values of the process at previous points in time. The values of the weights may then be calculated using such methods as linear least squares, which minimizes the sum of the squares of the differences between the observed data and the data predicted by the linear approximation.

These access pattern statistics and the network configuration may then be used to determine the future placement of the data objects being hosted on the set of servers in the data center so as to avoid (or reduce) congestion. In one specific example, more recent prior access period(s) would have a higher weighting in the prediction algorithm.

Further, the information brokers may be informed of the designated new future locations of the data objects (the information brokers are assumed to already know the previous locations).

However, a given data object may not actually be moved until, for example, there is an access request for it in the current time period. When that request is received, the server at the new location contacts the server at the old location and the data object is sent both to the requestor and its new designated location.

In this way, unnecessary moves are avoided. For example, if there is no request for a data object that was designated to be moved in the current time period, and the data object is predicted to be moved yet again in the next time period or the data object is designated to go back to its previous location, the transfer of the data object across the network will be avoided.

In another example, the actual movement can be done after N (N being equal to or greater than 1) requests. In that case a given data object would be served from its current location until N requests are received. This would likely be more effective for data objects that are not very large but are expected to be in high demand.

Such a mechanism for logical movement of data objects is particularly effective where the access patterns are more dynamic, making the access predictions less accurate.

Figure 2:
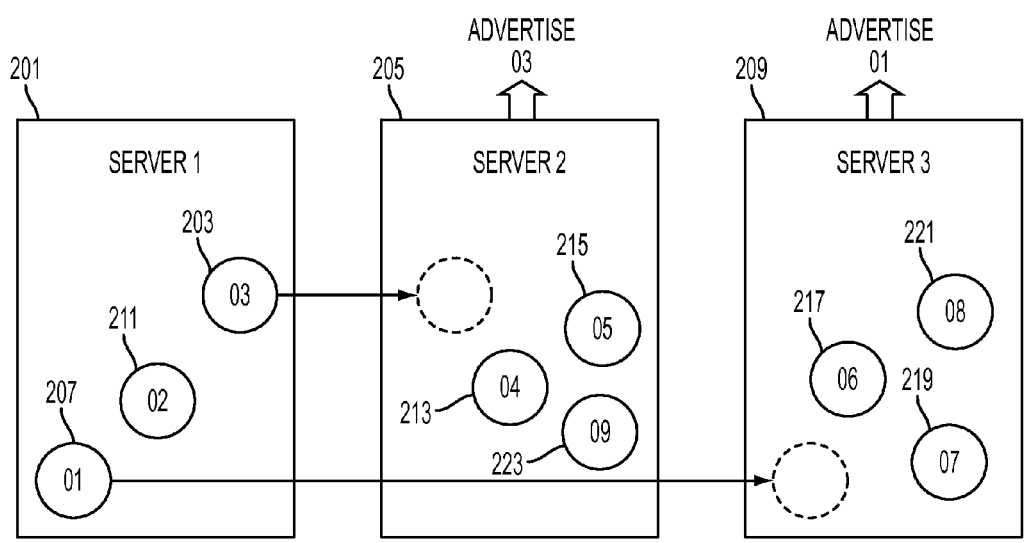
FIG. 2 depicts a block diagram of logical movement of data objects according to one embodiment of the present invention.

Referring now to FIG. 2, an example logical movement of data objects according to one embodiment is shown. As seen in this FIG. 2, server 1 (call-out number 201) is assumed to be heavily loaded so data object 3 (call-out number 203) is chosen to be moved to server 2 (call-out number 205) and data object 1 (call-out number 207) is chosen to be moved to server 3 (call-out number 209). Each of data objects 2 and 4-9 (respectively call-out numbers 211, 213, 215, 217, 219, 221 and 223) are not discussed further for this example.

As seen, when data object 3 is chosen to be moved to server 2, server 2 may advertise data object 3. Similarly, when data object 1 is chosen to be moved to server 3, server 3 may advertise data object 1.

In this example, each of data object 3 and data object 1 will remain on server 1 until there is an explicit request in the current time period from some information consumer. At the time of an actual request for a particular data object, movement of such data object would occur.

If, for example, there is a request for data object 3, but no request is received for data object 1, then only data object 3 is moved. Data placement may then be recalculated based upon the history of access patterns and/or future predictions (for example, the movement of data object 3 may have decreased the congestion at server 1 sufficiently that data object 1 would no longer be chosen to be moved).

As described herein, a method for moving data objects within a data center from a first server to a second server may be provided. The method may comprise the steps of: advertising a data object to be "owned" by (that is, be available at) the second server instead of the first server; receiving a request at the second server for the data object; and copying (or moving) the data object from the first sever to the second server in order to respond to the request.

As described herein, a method for performing movement of data objects within a data center is provided. The method may comprise the steps of: measuring the frequency of accesses to one or more hosted data objects (in one example, the measuring may be in consecutive periods of time); predicting the frequency of access in the next time period or periods; using the statistics (e.g., measured and/or predicted frequency of access) and the network configuration to determine the placement of one or more data objects in such a way that hotspots are avoided and/or attenuated (such a method may implement, for example, Least Recently Used or Least Loaded server as the target of data placement when a data request rate exceeds a threshold and may comprise data demand pattern along with count of data object to keep track of data object popularity and network configuration statistics like minimum number of hops, and bandwidth requirement to predict access rate and to prevent congestion subject to the storage constraint); routing requests to the new locations of the object(s) before the object(s) have been moved; upon receiving the first (or Nth) request for an object in the current period, serving the request from the old location and moving the object to the new location; and continuing to serve the object from the new location until a new placement of objects is determined. The method may comprise joint optimization of data placement and routing.

Figure 3:
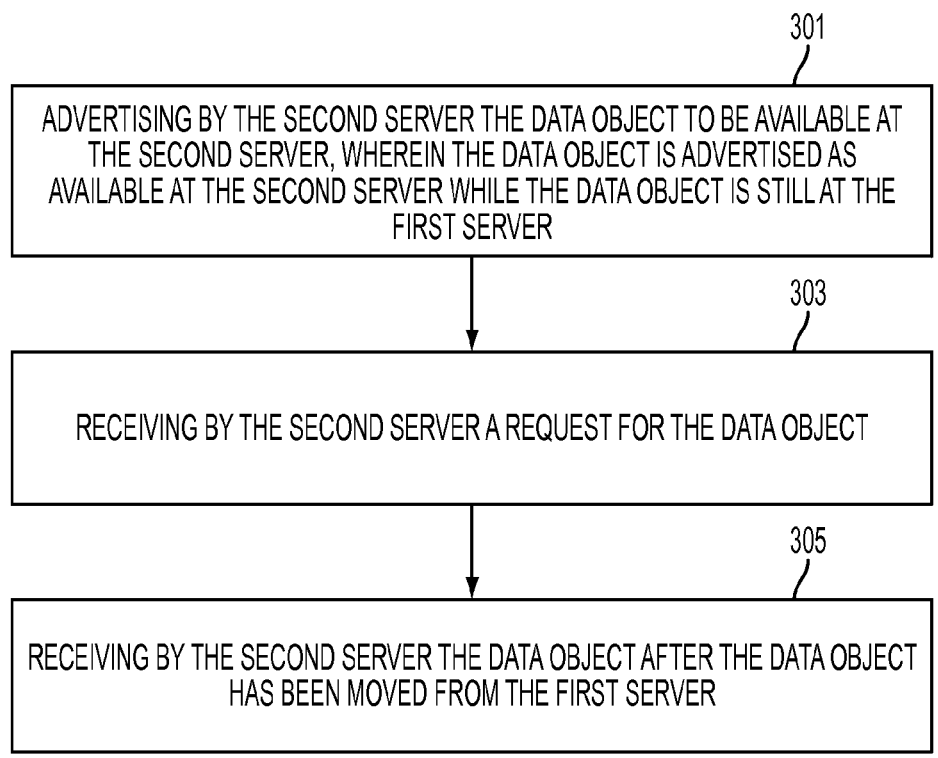
FIG. 3 depicts a flowchart of a method according to one embodiment of the present invention.

Referring now to FIG. 3, a method implemented in a computer system for movement of at least one data object from a first server to a second server is shown. As seen in this FIG. 3, the method of this embodiment comprises: Step 301—advertising by the second server the data object to be available at the second server, wherein the data object is advertised as available at the second server while the data object is still at the first server; Step 303—receiving by the second server a request for the data object; and Step 305—receiving by the second server the data object after the data object has been moved from the first server.

In one example, any steps may be carried out in the order recited or the steps may be carried out in another order.

Figure 4:
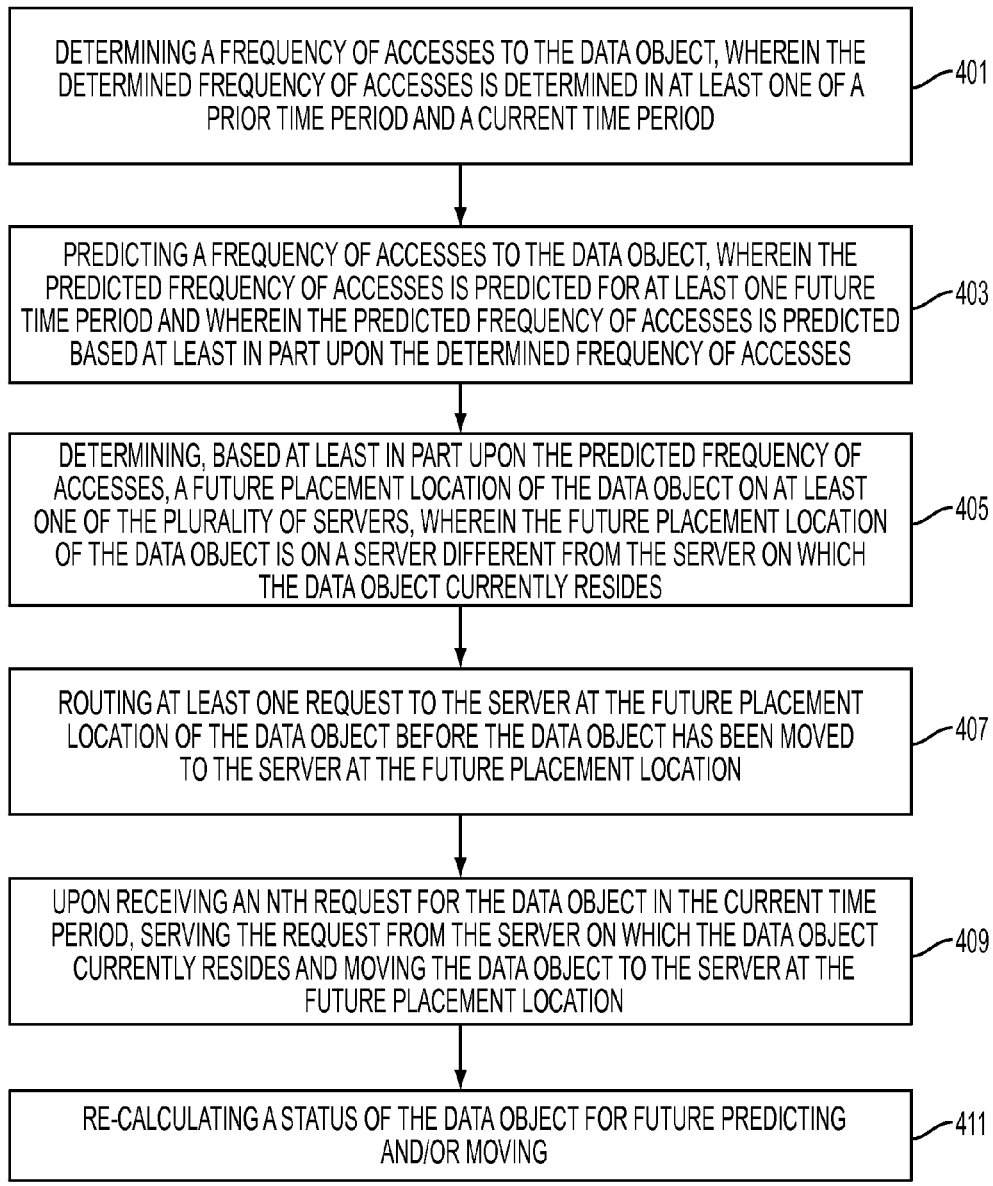
FIG. 4 depicts a flowchart of a method according to one embodiment of the present invention.

Referring now to FIG. 4, a method implemented in a computer system for movement of at least one data object between at least two of a plurality of servers is shown. As seen in this FIG. 4, the method of this embodiment comprises: Step 401—measuring a frequency of accesses to the data object, wherein the measured frequency of accesses is measured in at least one of a prior time period and a current time period; Step 403—predicting a frequency of accesses to the data object, wherein the predicted frequency of accesses is predicted for at least one future time period and wherein the predicted frequency of accesses is predicted based at least in part upon the measured frequency of accesses; Step 405—determining, based at least in part upon the predicted frequency of accesses, a future placement location of the data object on at least one of the plurality of servers, wherein the future placement location of the data object is on a server different from the server on which the data object currently resides; Step 407—routing at least one request for the data object to the server at the future placement location of the data object before the data object has been moved to the server at the future placement location; Step 409—upon receiving an Nth request for the data object (e.g., at a central processor or at any server in the network) in the current time period, serving the request from the server on which the data object currently resides and moving the data object to the server at the future placement location; and Step 411—re-calculating a status of the data object for future predicting and/or moving.

In one example, any steps may be carried out in the order recited or the steps may be carried out in another order.

Figure 5:
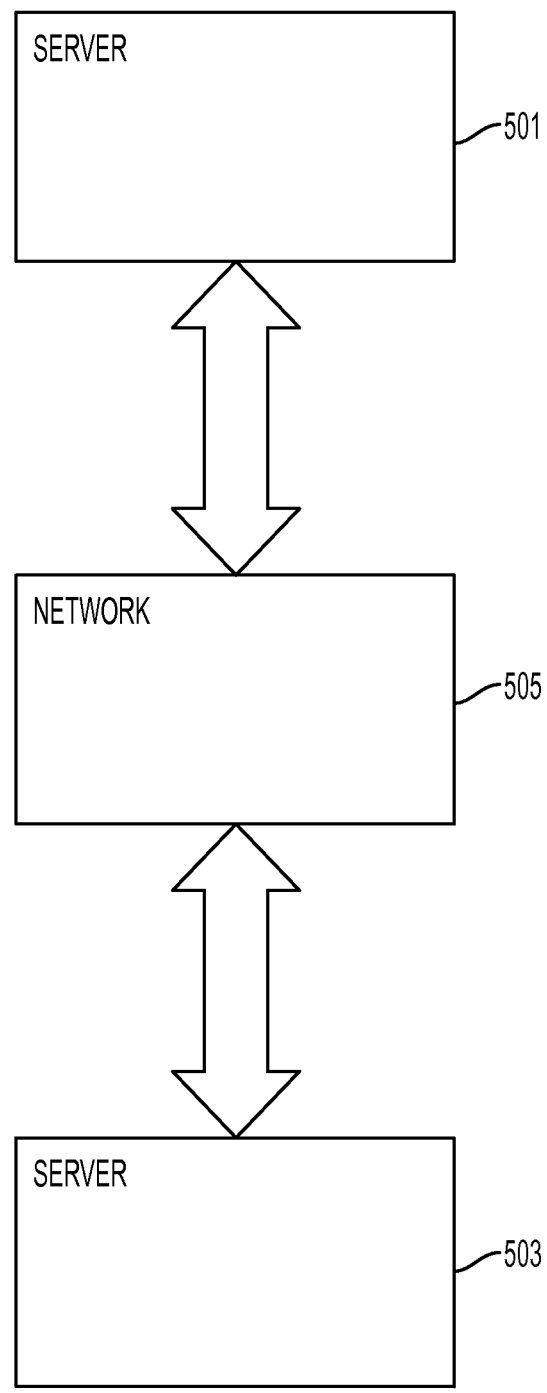
FIG. 5 depicts a block diagram of a system according to one embodiment of the present invention.

Referring now to FIG. 5, a computer-implemented system for movement of at least one data object between at least two of a plurality of servers is shown. As seen in this FIG. 5, the system comprises a server 501, wherein: the server 501 is configured to advertise the availability of the data object at the server 501, wherein the data object is advertised as available at the server 501 while the data object is still at a different server 503; the server 501 is configured to receive a request for the data object; and the server 501 is configured to receive the data object after the data object has been moved from the different server 503.

Still referring to FIG. 5, the communications may be carried out via network 505. Of course, network 505 may comprise the Internet, an intranet, a local area network, a wide area network and/or any other desired communication channel(s).

Figure 6:
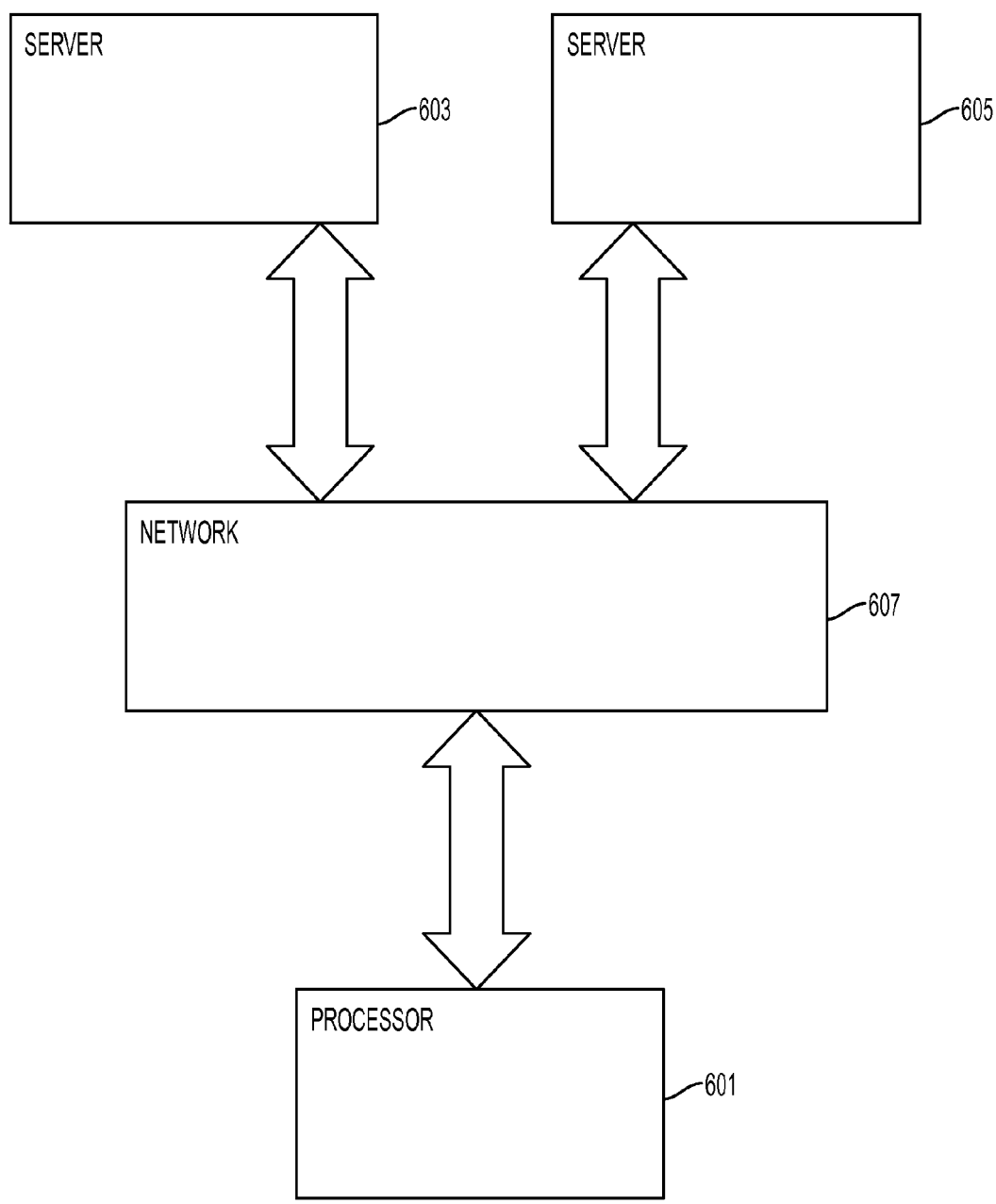
FIG. 6 depicts a block diagram of a system according to one embodiment of the present invention.

Referring now to FIG. 6, a computer-implemented system for movement of at least one data object between at least two of a plurality of servers is shown. As seen in this FIG. 6, the system comprises a processor 601, wherein: the processor 601 is configured to determine a frequency of accesses to the data object, wherein the determined frequency of accesses is determined in at least one of a prior time period and a current time period; the processor 601 is configured to predict a frequency of accesses to the data object, wherein the predicted frequency of accesses is predicted for at least one future time period and wherein the predicted frequency of accesses is predicted based at least in part upon the determined frequency of accesses; the processor 601 is configured to determine, based at least in part upon the predicted frequency of accesses, a future placement location of the data object on at least one of the plurality of servers, wherein the future placement location of the data object is on a server 603 different from the server 605 on which the data object currently resides; the processor 601 (and/or one or more information brokers) is/are configured to route at least one request to the server 603 at the future placement location of the data object before the data object has been moved to the server 603 at the future placement location; and the processor 601 (and/or one or more information brokers) is/are configured to, upon the detection of an Nth request for the data object in the current time period, direct serving of the request from the server 605 on which the data object currently resides and direct moving the data object to the server 603 at the future placement location.

Still referring to FIG. 6, in one example, the processor 601 receives information from each of the servers in the system about the frequency of access to each of the data objects that these servers have advertised in a particular time period. The processor 601 may store the history of such accesses and use the information to predict (e.g., using a prediction algorithm) the access patterns in the next period. In another example, one or more information brokers may use the information to predict (e.g., using a prediction algorithm) the access patterns in the next period. In another example, a plurality of computers (machines) may route requests.

Still referring to FIG. 6, in one example, the server at which the data object is located will detect when N requests have been served and send the data object to the server at which the data object was meant to be placed. When that server acknowledges receipt of the data object, the changes may be advertised to the information brokers.

In other examples, one or more computers may route requests and/or one or more computers may run one or more prediction algorithms.

Still referring to FIG. 6, the communications may be carried out via network 607. Network 607 may comprise the Internet, an intranet, a local area network, a wide area network and/or any other desired communication channel(s).

Figure 7:
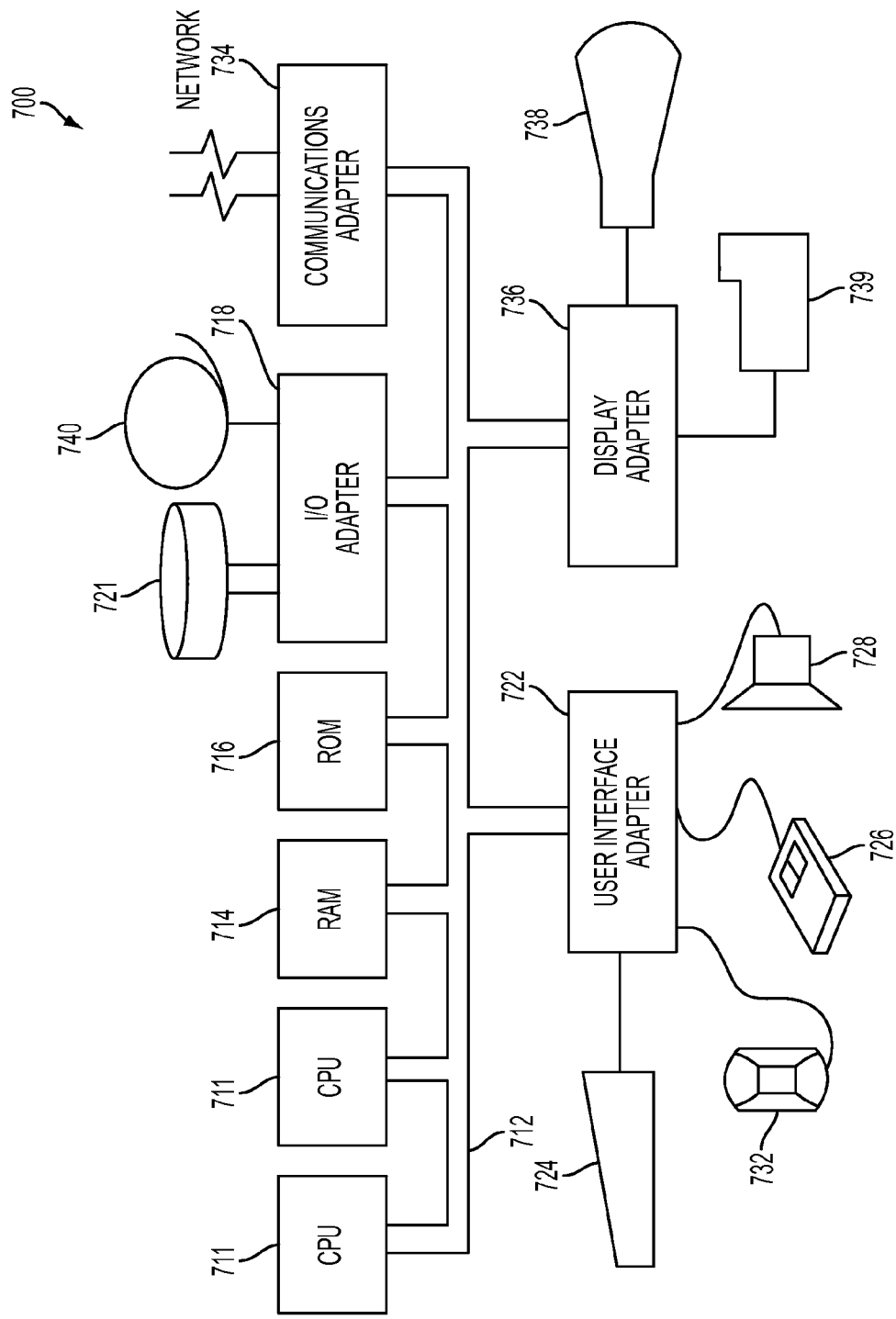
FIG. 7 depicts a block diagram of a system according to one embodiment of the present invention.

Referring now to FIG. 7, this figure shows a hardware configuration of computing system 700 according to an embodiment of the present invention. As seen, this hardware configuration has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communications adapter 734 for connecting the system 700 to a data processing network, the Internet, an Intranet, a local area network (LAN), etc., and a display adapter 736 for connecting the bus 712 to a display device 738 and/or printer 739 (e.g., a digital printer or the like).

In other examples, any steps described herein may be carried out in any appropriate desired order.

In one embodiment, a method implemented in a computer system for movement of at least one data object from a first server to a second server is provided, the method comprising: advertising by the second server the data object to be available at the second server, wherein the data object is advertised as available at the second server while the data object is still at the first server; receiving by the second server a request for the data object; and receiving by the second server the data object after the data object has been moved from the first server.

In one example, the second server responds to the request with the received data object.

In another example, the first server responds to the request with the data object.

In another example, the first server and the second server are within a data center.

In another example, the first server and the second server are part of at least one of: (a) an IP-based network; and (b) a named data network.

In another embodiment, a method implemented in a computer system for movement of at least one data object between at least two of a plurality of servers is provided, the method comprising: determining a frequency of accesses to the data object, wherein the determined frequency of accesses is determined in at least one of a prior time period and a current time period; predicting a frequency of accesses to the data object, wherein the predicted frequency of accesses is predicted for at least one future time period and wherein the predicted frequency of accesses is predicted based at least in part upon the determined frequency of accesses; determining, based at least in part upon the predicted frequency of accesses, a future placement location of the data object on at least one of the plurality of servers, wherein the future placement location of the data object is on a server different from the server on which the data object currently resides; routing at least one request to the server at the future placement location of the data object before the data object has been moved to the server at the future placement location; and upon receiving an Nth request for the data object in the current time period, serving the request from the server on which the data object currently resides and moving the data object to the server at the future placement location.

In one example, the method further comprises determining the frequency of accesses to the data object in the prior time period and in the current time period.

In another example, the method further comprises determining the frequency of accesses to the data object in a plurality of prior time periods.

In another example, the determining the future placement location of the data object on at least one of the plurality of servers is further based at least in part upon a configuration of a network of which the server on which the data object currently resides and the server at the future placement location form a part.

In another example, the determining the future placement location of the data object on at least one of the plurality of servers is carried out to minimize or avoid one or more hotspots.

In another example, N is an integer between 1 and 1,000, inclusive. In another example, N is any desired value.

In another example, the method further comprises: after the data object is moved to the server at the future placement location, continuing to serve the data object from the server at the future placement location until a new placement of the data object at another one of the servers is determined.

In another example, the servers are within a data center.

In another example, the servers are part of at least one of: (a) an IP-based network; and (b) a named data network.

In another example, the determining the frequency of accesses to the data object comprises measuring the frequency of accesses to the data object and wherein the measured frequency of accesses is measured in at least one of a prior time period and a current time period.

In another example, the predicted frequency of accesses is predicted for at least one future time period and wherein the predicted frequency of accesses is predicted based at least in part upon the measured frequency of accesses.

In another example, routing is performed by a plurality of computers.

In another example, the determining the frequency of accesses to the data object may be based at least in part on information one or more servers have on how many requests it/they received.

In another embodiment, a computer readable storage medium, tangibly embodying a program of instructions executable by the computer for movement of at least one data object from a first server to a second server is provided, the program of instructions, when executing, performing the following steps: advertising by the second server the data object to be available at the second server, wherein the data object is advertised as available at the second server while the data object is still at the first server; receiving by the second server a request for the data object; and receiving by the second server the data object after the data object has been moved from the first server.

In one example, the program of instructions, when executing, causes the second server to respond to the request with the received data object.

In another example, the program of instructions, when executing, causes the first server to respond to the request with the data object.

In another example, the first server and the second server are within a data center.

In another example, the first server and the second server are part of at least one of: (a) an IP-based network; and (b) a named data network.

In another embodiment, a computer readable storage medium, tangibly embodying a program of instructions executable by the computer for movement of at least one data object between at least two of a plurality of servers is provided, the program of instructions, when executing, performing the following steps: determining a frequency of accesses to the data object, wherein the determined frequency of accesses is determined in at least one of a prior time period and a current time period; predicting a frequency of accesses to the data object, wherein the predicted frequency of accesses is predicted for at least one future time period and wherein the predicted frequency of accesses is predicted based at least in part upon the determined frequency of accesses; determining, based at least in part upon the predicted frequency of accesses, a future placement location of the data object on at least one of the plurality of servers, wherein the future placement location of the data object is on a server different from the server on which the data object currently resides; routing at least one request to the server at the future placement location of the data object before the data object has been moved to the server at the future placement location; and upon receiving an Nth request for the data object in the current time period, serving the request from the server on which the data object currently resides and moving the data object to the server at the future placement location.

In one example, the program of instructions, when executing, determines the frequency of accesses to the data object in the prior time period and in the current time period.

In another example, the program of instructions, when executing, determines the frequency of accesses to the data object in a plurality of prior time periods.

In another example, the determining the future placement location of the data object on at least one of the plurality of servers is further based at least in part upon a configuration of a network of which the server on which the data object currently resides and the server at the future placement location form a part.

In another example, the determining the future placement location of the data object on at least one of the plurality of servers is carried out to minimize or avoid one or more hotspots.

In another example, N is an integer between 1 and 1,000, inclusive. In another example, N is any desired value.

In another example, the program of instructions, when executing, further causes: after the data object is moved to the server at the future placement location, continuing to serve the data object from the server at the future placement location until a new placement of the data object at another one of the servers is determined.

In another example, the servers are within a data center.

In another example, the servers are part of at least one of: (a) an IP-based network; and (b) a named data network.

In another example, the determining the frequency of accesses to the data object comprises measuring the frequency of accesses to the data object and wherein the measured frequency of accesses is measured in at least one of a prior time period and a current time period.

In another example, the predicted frequency of accesses is predicted for at least one future time period and wherein the predicted frequency of accesses is predicted based at least in part upon the measured frequency of accesses.

In another example, routing is performed by a plurality of computers.

In another example, the determining the frequency of accesses to the data object may be based at least in part on information one or more servers have on how many requests it/they received.

In another embodiment, a computer-implemented system for movement of at least one data object between at least two of a plurality of servers is provided, the system comprising: a server, wherein: the server is configured to advertise the availability of the data object at the server, wherein the data object is advertised as available at the server while the data object is still at a different server; the server is configured to receive a request for the data object; and the server is configured to receive the data object after the data object has been moved from the different server.

In another embodiment, a computer-implemented system for movement of at least one data object between at least two of a plurality of servers is provided, the system comprising: a processor, wherein: the processor is configured to determine a frequency of accesses to the data object, wherein the determined frequency of accesses is determined in at least one of a prior time period and a current time period; the processor is configured to predict a frequency of accesses to the data object, wherein the predicted frequency of accesses is predicted for at least one future time period and wherein the predicted frequency of accesses is predicted based at least in part upon the determined frequency of accesses; the processor is configured to determine, based at least in part upon the predicted frequency of accesses, a future placement location of the data object on at least one of the plurality of servers, wherein the future placement location of the data object is on a server different from the server on which the data object currently resides; the processor is configured to route at least one request to the server at the future placement location of the data object before the data object has been moved to the server at the future placement location; and the processor is configured to, upon the detection of an Nth request for the data object in the current time period, direct serving of the request from the server on which the data object currently resides and direct moving the data object to the server at the future placement location.

In one example, N is an integer between 1 and 1,000, inclusive. In another example, N is any desired value.

In another example, the frequency of accesses to the data object is determined by measuring the frequency of accesses to the data object and wherein the measured frequency of accesses is measured in at least one of a prior time period and a current time period.

In another example, the frequency of accesses is predicted for at least one future time period and wherein the predicted frequency of accesses is predicted based at least in part upon the measured frequency of accesses.

In another example, routing is performed by a plurality of computers.

In another example, the determining the frequency of accesses to the data object may be based at least in part on information one or more servers have on how many requests it/they received.

In other examples, embodiments may be applied in the context of software (e.g., data access, analysis, delivery, system and network management, web technology and/or content management and use).

In other examples, embodiments may improve performance by avoiding hotspot creation in data center networks.

As described herein, mechanisms are provided for allocating a data object to be migrated to a target server based on the historic access rate of the data object and migrating the data object to the target server for the purpose of avoiding and/or reducing hot-spots, wherein the migration is based on an actual request for the data object at the target server.

As described herein, mechanisms are provided that take into account request statistics and/or network configuration to logically migrate a data object to a target server for the purpose of avoiding and/or reducing hot-spots (and only performing the migration if an actual request for the data object is made to the system (e.g., NDN system).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A computer readable storage device, tangibly embodying a program of instructions executable by the computer for movement of at least one particular data object from a first server to a second server, the program of instructions, when executing, performing the following steps:
    advertising by the second server the particular data object that will in the future be available at the second server, wherein the particular data object is advertised as available at the second server while the particular data object is still at the first server and before the particular data object has been moved to the second server;
    receiving by the second server a request for the particular data object; and
    receiving by the second server the particular data object after the particular data object has been moved from the first server;
    wherein the first server and the second server are part of a named data network;
    wherein the first server responds to the request with the particular data object; and
    wherein movement of the particular data object from the first server results in another data object at the first server, which had previously been chosen to otherwise be moved, to not be moved.

2. The computer readable storage medium of claim 1, wherein the first server and the second server are within a data center.

3. A computer readable storage device, tangibly embodying a program of instructions executable by the computer for movement of at least one data object between at least two of a plurality of servers, the program of instructions, when executing, performing the following steps:
    determining a frequency of accesses to the data object, wherein the determined frequency of accesses is determined in a plurality of prior time periods and a current time period;
    predicting a frequency of accesses to the data object, wherein the predicted frequency of accesses is predicted for at least one future time period, wherein the predicted frequency of accesses is predicted based at least in part upon the determined frequency of accesses, and wherein the predicted frequency of accesses is predicted by giving at least one of the more recent prior time periods a higher weighting;
    determining, based at least in part upon the predicted frequency of accesses, a future placement location of the data object on at least one of the plurality of servers, wherein the future placement location of the data object is on a server different from the server on which the data object currently resides;
    routing at least one request to the server at the determined future placement location of the data object before the data object has been moved to the server at the determined future placement location; and
    upon receiving an Nth request for the data object in the current time period, serving the request from the server on which the data object currently resides and moving the data object to the server at the determined future placement location;
    wherein the servers are part of a named data network; and
    wherein movement of the data object from the server on which the data object currently resides results in another data object at the server on which the data object currently resides, which had previously been chosen to otherwise be moved, to not be moved.

4. The computer readable storage device of claim 3, wherein the determining the future placement location of the data object on at least one of the plurality of servers is further based at least in part upon a configuration of a network of which the server on which the data object currently resides and the server at the determined future placement location form a part.

5. The computer readable storage medium of claim 3, wherein the determining the future placement location of the data object on at least one of the plurality of servers is carried out to minimize or avoid one or more hotspots.

6. The computer readable storage medium of claim 3, wherein N is an integer between 1 and 1,000, inclusive.

7. The computer readable storage medium of claim 3, wherein the program of instructions, when executing, further causes:
    after the data object is moved to the server at the determined future placement location, continuing to serve the data object from the server at the determined future placement location until a new placement of the data object at another one of the servers is determined.

8. The computer readable storage device of claim 3, wherein the servers are within a data center.

9. The computer readable storage medium of claim 3, wherein the determining the frequency of accesses to the data object comprises measuring the frequency of accesses to the data object.

10. The computer readable storage medium of claim 9, wherein the predicted frequency of accesses is predicted for at least one future time period and wherein the predicted frequency of accesses is predicted based at least in part upon the measured frequency of accesses.

11. The computer readable storage medium of claim 3, wherein routing is performed by a plurality of computers.

12. A computer-implemented system for movement of at least one particular data object between at least two of a plurality of servers, the system comprising:
a server, wherein:
the server is configured to advertise the availability of the particular data object that will in the future be available at the server, wherein the particular data object is advertised as available at the server while the particular data object is still at a different server and before the particular data object has been moved to the server;
the server is configured to receive a request for the particular data object; and
the server is configured to receive the particular data object after the particular data object has been moved from the different server;
wherein the plurality of servers are part of a named data network;
wherein the different server responds to the request with the particular data object; and
wherein movement of the particular data object from the different server results in another data object at the different server, which had previously been chosen to otherwise be moved, to not be moved.

13. A computer-implemented system for movement of at least one data object between at least two of a plurality of servers, the system comprising:
a processor, wherein:
the processor is configured to determine a frequency of accesses to the data object, wherein the determined frequency of accesses is determined in a plurality of prior time periods and a current time period;
the processor is configured to predict a frequency of accesses to the data object, wherein the predicted frequency of accesses is predicted for at least one future time period, wherein the predicted frequency of accesses is predicted based at least in part upon the determined frequency of accesses, and wherein the predicted frequency of accesses is predicted by giving at least one of the more recent prior time periods a higher weighting;
the processor is configured to determine, based at least in part upon the predicted frequency of accesses, a future placement location of the data object on at least one of the plurality of servers, wherein the future placement location of the data object is on a server different from the server on which the data object currently resides;
the processor is configured to route at least one request to the server at the determined future placement location of the data object before the data object has been moved to the server at the determined future placement location; and
the processor is configured to, upon the detection of an Nth request for the data object in the current time period, direct serving of the request from the server on which the data object currently resides and direct moving the data object to the server at the determined future placement location;
wherein the servers are part of a named data network; and
wherein movement of the data object from the server on which the data object currently resides results in another data object at the server on which the data object currently resides, which had previously been chosen to otherwise be moved, to not be moved.

14. The system of claim 13, wherein N is an integer between 1 and 1,000, inclusive.

15. The system of claim 13, wherein the frequency of accesses to the data object is determined by measuring the frequency of accesses to the data object.

16. The system of claim 15, wherein the frequency of accesses is predicted for at least one future time period and wherein the predicted frequency of accesses is predicted based at least in part upon the measured frequency of accesses.

17. The system of claim 13, wherein routing is performed by a plurality of computers.

* * * * *